United States Patent [19]

Umezu

[11] 3,848,840
[45] Nov. 19, 1974

[54] PLASTIC CLAMPING RIDGED STRAP

[76] Inventor: Hideo Umezu, 17-17, Koishikawa 4-chome, Bunkyo-ku, Tokyo, Japan

[22] Filed: Jan. 8, 1973

[21] Appl. No.: 321,849

[30] Foreign Application Priority Data
Jan. 8, 1972 Japan................................ 47-4451
Oct. 13, 1972 Japan............................ 47-101851
Oct. 13, 1972 Japan............................ 47-101852

[52] U.S. Cl. .................. 248/73, 24/73 AP, 248/71, 248/74 PB, 248/361 A
[51] Int. Cl. ............................................. F16l 3/08
[58] Field of Search.... 248/73, 74 PB, 361 A, 74 R, 248/74 B, 71, 62, 60, 70, 68 R, 216, 220.5, 223, 49, 50, 54 R, DIG. 3; 24/73 AP, 73 PB, 16 PB, 30.5 P, 17, 16 R, 19; 174/40 CC

[56] References Cited
UNITED STATES PATENTS

| 3,098,273 | 7/1963 | Cochran............................ | 24/73 PB |
| 3,197,164 | 7/1965 | Hansen ....................... | 248/74 PB X |
| 3,252,190 | 5/1966 | Holton et al..................... | 24/73 AP |
| 3,486,200 | 12/1969 | Orenick ........................... | 24/16 PB |
| 3,670,369 | 6/1972 | McIlroy............................. | 24/16 PB |
| 3,747,164 | 7/1973 | Fortsch ............................ | 24/16 PB |

FOREIGN PATENTS OR APPLICATIONS
1,471,561   3/1967   France ............................ 24/16 PB Primary Examiner—Roy D. Frazier
Assistant Examiner—Rodney H. Bonck
Attorney, Agent, or Firm—Kurt Kelman

[57] ABSTRACT

Disclosed is a plastic clamping ridged strap which can clampingly hold an object such as an electric wire, onto a plate in cooperation with associated apertures in the plate. The clamping strap according to this invention is composed of an elongated plastic band molded to have a plurality of tall and short ridges arranged alternately with each other in such a way that each tall ridge is nearer to one adjacent short ridge than to the other. The ridged strap can pass the associated aperture of the plate only in one direction by allowing the tall ridges to yieldingly bend down when caught by the opening edge of the associated aperture. The ridged strap, however, cannot pass the associated aperture in the other direction because the short ridge will prevent the tall ridge from bending to a level low enough to allow the ridged strap to pass the aperture.

11 Claims, 19 Drawing Figures

PLASTIC CLAMPING RIDGED STRAP

This invention relates to a clamping device, and more particularly to a clamping strap to hold an object such as an electric wire onto a plate.

As is well known, the conventional clamping strap is composed of a tape of polypropylene or other suitably resilient material molded to have a plurality of transverse ridges spaced at regular intervals and integrally connected to one of the surfaces of said tape. In the clamping operation the clamping strap is used with an auxiliary device having resilient male portions to fit in the interspaces between adjacent ridges of the clamping strap. The clamping strap is inserted in the associated apertures of the auxiliary device, and then the clamping strap is connected with the auxiliary device in a proper position by allowing the male portions of the auxiliary to fit in the selected interspaces between adjacent ridges of the clamping strap. As is readily understood from the above, in instances where an object is fixed to a plate, the conventional clamping strap cannot make use of apertures made in the plate. The object of this invention is to provide a clamping ridged strap which is adapted to fix an object such as an electric wire onto a plate by making use of the associated apertures of the plate.

To attain this object the clamping ridged strap according to this invention comprises an elongated plastic band on one surface of which tall flexible ridges and short rigid ridges are arranged alternately in such a way that each tall ridge is nearer to one of the adjacent short ridges than to the other. The apertures of the plate are large enough to allow the tall ridge to pass when caught and yieldingly bet down by the edge of the aperture.

Another object of this invention is to provide a plastic ridged clamping strap which requires only a small force in inserting and pulling out the ridged strap from the associated aperture.

To attain this object the plastic ridged strap according to this invention is composed of an elongated plastic band having a plurality of alternate tall and short ridges inclined to the transverse direction of the strap.

Still another object of this invention is to provide the ridges strap of the type mentioned above which permits both terminal lengths of the strap to pass together through a single aperture of the plate from the accessible side thereof in one direction.

To attain this object the ridged strap according to this invention is composed of an elongated plastic band having a plurality of alternate tall and short ridges arranged in a symmetric spacing relation with respect to the center of the strap.

The other objects and advantages of this invention will be more apparent from the following description when considered in connection with the accompanying drawings in which:

FIG. 7A is a sectional elevation of the second embodiment taken along the line A—A of FIG. 6, whereas FIG. 7B is a sectional elevation taken along the line B—B of FIG. 6.

Figure 17:
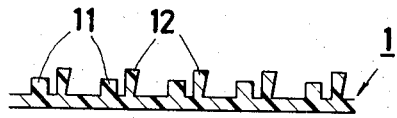
Figure 18:
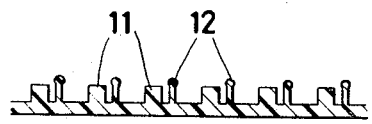
Figure 19:
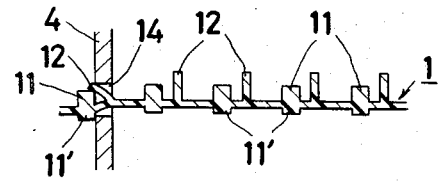

FIGS. 17 — 19 are longitudinal sections of different modifications of this invention, showing variety of ridge shapes.

Figure 1:
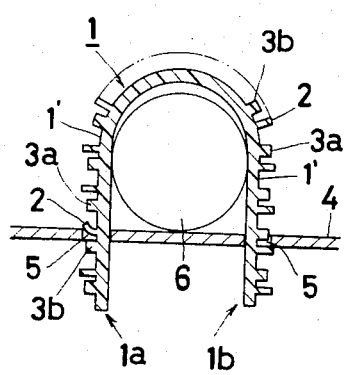
FIG. 1 is a sectional view of the first embodiment of this invention in a clamping position.
Figure 2:
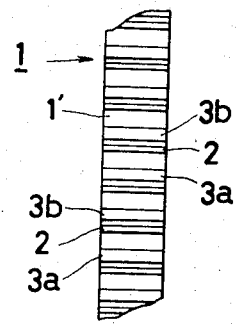
FIG. 2 shows a plane view of the first embodiment of this invention.
Figure 3:
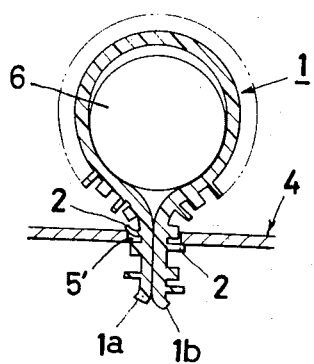
FIG. 3 is a sectional view of the first embodiment in a different clamping mode.

Referring to FIGS. 1 – 3, the first embodiment of this invention is shown in different positions. A flexible elongated plastic band is indicated by reference numeral 1'. A number of tall and short ridges 2 and 3 are integrally connected to one surface of the band 1'. Each tall ridge 2 is so near to one of the adjacent short ridges 3a and 3b that when the tall ridge 2 is caught and bent to the short ridge 3b by the opening edge of the aperture 5, the short ridge 3b will prevent the tall ridge 2 from bending to a level low enough to allow the ridged strap 1 to pass through the aperture 5. However, the tall ridge 2 is at such a distance from the other short ridge 3a that when the tall ridge 2 is caught and bent down by the opening edge of the aperture 5, the other short ridge 3a will not prevent the tall ridge 2 from bending to a level low enough to allow the ridged strap 1 to pass through the aperture 5. Stated otherwise, the ridged strap can be passed through the aperture in one direction, but cannot be passed in the other direction. As seen from the drawings, apertures 5 in the form of slits are made in the plate 4. The apertures 5 thus made are large enough to allow the tall ridge 2 to pass through the aperture 5 when it is caught and yieldingly bent down by the opening edge of the aperture. In fixing an object to a plate 4, the tall ridges of the strap when passing the associated aperture, are yieldably bent, thus allowing the strap to pass through the aperture from one side to the other of the plate in nonreturnable manner. As seen from FIG. 1, the strap 1 can be inserted in the apertures 5 of the plate 4 in one longitudinal direction (from one end 1a to the other end 1b of the strap), but the strap cannot be inserted in the apertures 5 in the other longitudinal direction because the short ridges 3 will prevent the associated tall ridges 2 from bending down when passing through the apertures of the plate. In instances where an object is fixed to the plate having two slots 5, 5 as shown in FIG. 1, one end 1a of the strap is inserted into one of the apertures 5 from the undersurface to the uppersurface of the plate 4 in a non-returnable way, and then the end 1a of the strap is again inserted into the other aperture 5 from the uppersurface to the undersurface of the plate 4 in a non-returnable way. Thus, the object 6 will be positively fixed to the plate 4.

In instances where an object 6 is fixed to a plate 4 having a single aperture 5' are shown in FIG. 3, first, one end 1b of the strap 1 is inserted in the aperture, second the strap 1 is partly wound around the object, and finally, the other end 1a of the strap 1 is inserted into the remaining space of the aperture 5' by allowing the high ridges 2 to bend down when passing through the aperture 5'. The aperture size is as large as twice the band 1' thickness plus the short ridge height, or somewhat larger.

As seen from the above, the first embodiment of this invention has directionality in passing an associated aperture. When used in association with two apertures of the plate, the strap is inserted into one of the apertures in one direction (for instance, from the underside to upperside of the plate), and the belt after partly encircling the object is again inserted into the other aperture in the opposite direction (for instance, from the upperside to underside of the plate), because otherwise, the strap cannot be inserted into the apertures of the plate. For the same reasons it is impossible, after the strap been partly wound around the object, for the opposite terminal lengths of the strap to be laid on each other and together pulled out from a single aperture to hold the object onto the plate (See FIG. 3).

Figure 4:
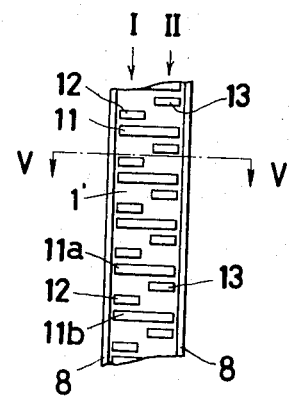
FIG. 4 is a plane view of the second embodiment of this invention.
Figure 5:
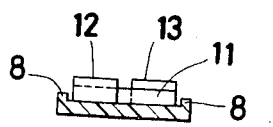
FIG. 5 is a cross-section taken along the line V—V of FIG. 4.

Referring to FIGS. 4 and 5, a non-directional clamping ridged strap is shown. This second embodiment can be nonreturnably inserted into the associated apertures of the plate in either direction. Also, it is possible to put the opposite terminal lengths of the strap on each other and together pull them out from the single aperture in a non-returnable way, thus clampingly holding the object onto the plate.

As shown in the drawings, band 1' has a number of short, rigid ridges 11 and tall, flexible ridges 12, 13 integrally connected to one surface of the band. The transverse dimension or width of the tall ridges 12, 13 is half that of the short ridges 11, and two tall ridges 12 and 13 are arranged between adjacent short ridges 11 in staggered relation. Thus, one longitudinal half I of the band 1' has a series of alternate short and tall ridges 11 and 12, whereas the other longitudinal half II of the band 1' has another series of alternate short and tall ridges 11 and 13. As shown in FIG. 4, the relative positioning of the tall ridge to the nearby short ridge in the series I is just opposite to that in the series II. More specifically, in the series I the tall ridge 12 can yieldingly bend down toward the short ridge 11a without obstruction, but in the other direction the tall ridge 12 cannot bend because of the obstruction caused by the short ridge 11b. On the other hand in the series II the tall ridge 13 can yieldingly bend down toward the short ridge 11 without obstruction, but in the other direction because of the obstruction caused by the short ridge 11. A reinforcing elongated rib 8 is integrally connected to either longitudinal edge of the strap.

Figure 6:
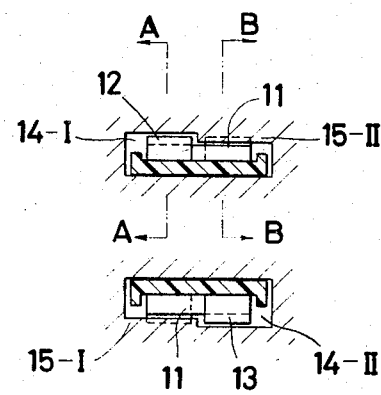
FIG. 6 is a sectional top view, showing the manner in which the second embodiment is used in association with two apertures of the plate.
Figure 7:
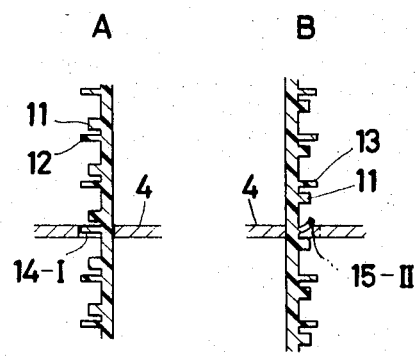

In instances where the clamping ridged strap of the type as shown in FIG. 4 is used in association with two apertures made in a plate, each aperture is composed of a wide slit opening portion and a narrow slit opening portion as shown in FIG. 6. More specifically, in one aperture a wide slit opening portion 14-I allows the tall ridges 12 of the series I to pass freely or without obstruction, and a narrow slit opening portion 15-II allows the tall ridges 13 of the series II only when yieldingly bent down to pass, whereas in the other aperture a wide slit opening portion 14-II allows the tall ridges 13 of the series II to pass freely, and a narrow slit opening portion 15-I allows the tall ridges 12 of the series I only when yieldingly bent down to pass.

Figure 8:
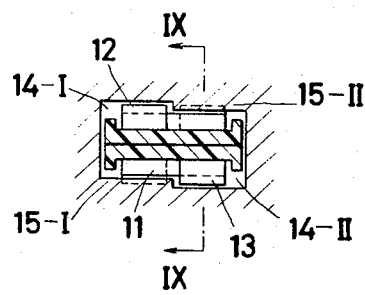
FIG. 8 is a sectional top view, showing the manner in which the second embodiment is used in association with a single aperture of the plate.
Figure 9:
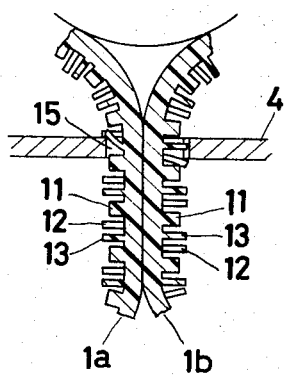
FIG. 9 is a sectional elevation taken along the line IX—IX of FIG. 8.

In instances where the clamping ridges strap of FIG. 4 is used in association with a single aperture made in a plate, the aperture is made in the form of staggered squares (See FIG. 8), which is equivalent to the combination of two aperture of FIG. 6. The opposite terminal lengths of the strap are laid on each other in back-to-back relation, and the opposite terminal lengths of the strap can be inserted together into the single aperture 15 is non-returnable fashion (See FIG. 9).

This mode of clamping is particularly advantageous to the fixing of an object to a plate whose one side is inaccessible.

Figure 10:
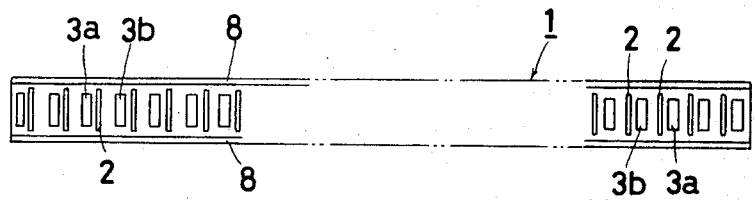
FIG. 10 is a plane view of the third embodiment of this invention.
Figure 11:
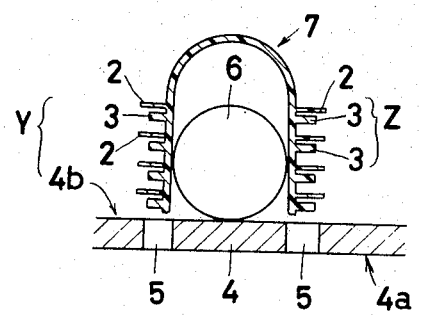
FIG. 11 is a sectional side view of the third embodiment, showing how the ridged strap is applied to the plate.

Referring to FIGS. 10 and 11, there is shown the third embodiment of this invention which permits both ends of the ridged strap to pass the associated apertures in the same direction in non-returnable fashion. As seen from FIG. 10, the tall flexible ridges 2 and the short, rigid ridges 3 are arranged alternately with each other in such a way that each flexible ridge 2 is nearer to the precedent rigid ridge 3a than to the subsequent rigid 3b in the opposite longitudinal directions as viewed from the center to the opposite ends of the strap. As shown in FIG. 11, both ends of the ridges strap after partially encircling the object 6 are inserted in the associated apertures 5 of the plate 4 in the same direction from the uppersurface 4b to the undersurface 4a of the plate 4. Tall and short ridges may be eliminated from the central length of the strap, thus leaving tall and short ridges in the opposite terminal extensions Y and Z and a central smooth section 7. One reinforcing elongated ridge 8 may be integrally connected to either longitudinal edge of the strap. The reinforcing projection 8 is as high as the short ridge, or is lower than the same. The ridged strap shown in FIG. 10 can be used in association with a single aperture in the same fashion as in FIG. 9.

Referring to FIGS. 12 – 16, there is shown the fourth embodiment having a plurality of tall and short ridges arranged alternate with each other and inclined with respect to the transverse direction of the strap. As is the case with the other precedent embodiments, each tall ridge 2 is nearer to one adjacent short ridge 3a than to the other adjacent short ridge 3b. Thus, when the strap is inserted into an associated aperture 5 in the direction from one end 9a to the other end 9a of the strap, each tall ridge 2 will yieldingly bend down without being obstructed by the adjacent short ridge 3b. When the strap is pulled in the other direction, however, each tall ridge 2 will strike against the adjacent short ridge 3a, thus preventing the tall ridge 2 from bending down below the level of the short ridge 3a.

Figure 13:
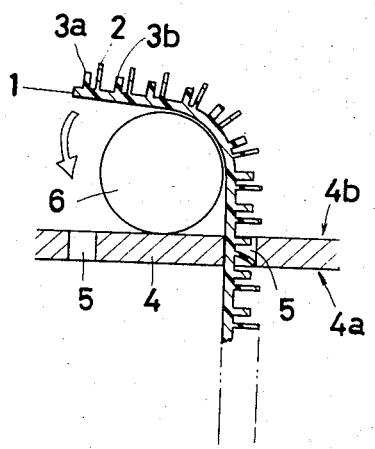
FIG. 13 is a sectional side view of the fourth embodiment, showing how the ridged strap is applied to the plate.

As shown in FIG. 13, a plate 4 has two slit apertures 5 which will allow every short ridge 3 to pass without obstruction, and will allow every tall ridge 2 to pass only when yieldingly bent down by the opening edge of the slit aperture. The ridged strap is passed through one aperture 5 from the back 4a to front side 4b of the plate 4 in non-returnable fashion, and after partially encircling the object 6 it is again passed through the other aperture 5 from the front 4b to back side 4a of the plate in non-returnable fashion. The inclination of each ridge to the transverse direction will permit the insertion of the ridged strap into the associated aperture with much smaller force than that required in inserting and pulling out the strap having the ridges arranged in the transverse direction. This is because every tall ridge 2 when passing the associated aperture 5 will yieldingly bend down in such a way that the bent portion will begin with one end 2' of the ridge which will be first caught by the opening edge of the aperture, ever increasing along the full length of the ridge to the other end 2'', thus reducing the counter force of the ridge in passing through the aperture. The force required in pulling the ridged strap through the associated aperture will decrease with the inclination angle $\phi$. The increase of the inclination angle, however, will cause a decrease in the clamping force of the strap, which originates from the close contact by the bent portion surface of the ridge against the inner wall of the aperture. The inclination angle $\phi$ may be varied in the range from 5 to 30° without adversely affecting the clamping force of the ridged strap when used.

Figure 12:
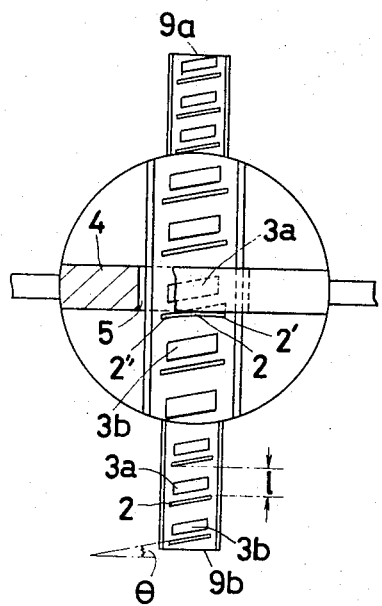
FIG. 12 is a plane view of the fourth embodiment of this invention, partly in an enlarged scale.
Figure 14:
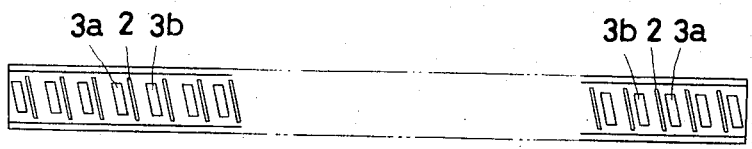
FIG. 14 is a plane view of the fifth embodiment of this invention.

Referring to FIG. 14, there is shown a modification of the ridged strap of FIG. 12. The tall and short ridges are arranged alternately with each other, and each tall ridge 2 is nearer to the precedent short ridge 3a than to the subsequent short ridge 3b in the opposite longitudinal directions as viewed from the center of the strap. Thus, both ends of the ridged strap can be inserted into the associated apertures in the same direction in non-returnable fashion. Contrary to the ridge orientation as shown in FIG. 14, one half of the ridges (right) may be inclined in the reverse fashion to the other half of the ridges (left).

Figure 15:
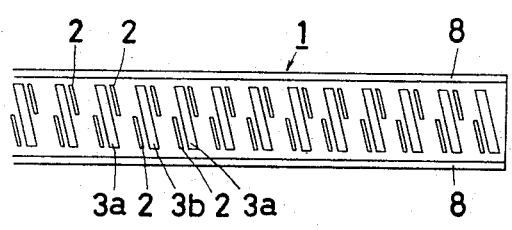
FIG. 15 is a plane view of the sixth embodiment of this invention.
Figure 16:
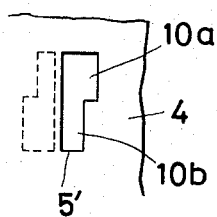
FIG. 16 shows the associated apertures of the plate.

Referring to FIG. 15, there is shown a stagger-ridged strap both ends of which can be inserted into the associated apertures in the same direction. As shown in the drawing, the positioning relation between the tall and short ridges on one longitudinal half of the strap is just reverse to that on the other longitudinal half. More specifically, in FIG. 15 each tall ridge 2 on the upper longitudinal half is nearer to the left adjacent short ridge 1a than to the right adjacent short ridge 3b, whereas each tall ridge 2 on the lower longitudinal half is nearer to the right adjacent short ridge 3a than to the left adjacent short ridge 3b. A reinforcing elongated projection 8 may be integrally connected to either edge of the belt strap. The shape of the associated apertures is shown in FIG. 16. The low step portion 10b of the key hole 5' is somewhat higher than the short ridge 3, whereas the high step portion 10a of the key hole is somewhat higher than the tall ridge 2.

Assume that both ends of the stagger-ridged strap is inserted from the front to back of the drawing paper. The shape of the aperture 5' which will accomodate the right end of the strap is shown in solid line, whereas the shape of the aperture which will accomodate the left end of the strap is shown in broken line in FIG. 16. In instances where the stagger-ridged strap is used in association with a single aperture, the shape of the aperture will be a combination of two key holes as shown in FIG. 16, generally forming a staggered square similar to the aperture of FIG. 8.

It is necessary that the longitudinal distance "l" between one end of a tall ridge and the other end of the next tall ridge is equal to or smaller than the thickness of the plate used. The embodiments mentioned above can be modified by giving different shapes to each tall flexible ridge (See FIGS. 17 and 18) or by providing extra ridges 11' onto the flat back of the strap in the opposite relation to the short rigid ridges 12. Each of these extra ridges 11' on the back of the strap will function to prevent the strap 1 from being pulled out by catching the associated opening edge of the aperture 14 when the tall flexible ridge 12 is bent over the short rigid ridge 11 (See FIG. 19). As a matter of course, it is necessary to enlarge the wide and narrow opening slit portions of the aperture by the thickness of extra ridge 11'.

What is claimed is:

1. In combination, a ridged plastic clamping strap composed of an elongated plastic band having a plurality of alternately arranged tall flexible ridges and short rigid ridges intergrally connected to one surface of the elongated band, each tall ridge being nearer to one adjacent short ridge than to the other adjacent short ridge, thus leaving a space between the tall ridge and the other adjacent short ridge sufficient to allow the tall ridge to bend down but leaving a space between the tall ridge and the one adjacent short ridge insufficient to allow the tall ridge to bend down; and a plate having at least one aperture which allows the short rigid ridges to pass without obstruction and allows the tall flexible ridges to pass only when yieldingly bent down.

2. The combination of claim 1, wherein the tall and short ridges are arranged in a direction perpendicular to the longitudinal direction of the ridged strap.

3. The combination of claim 2, wherein each tall ridge is nearer to the subsequent short ridge than to the precedent short ridge in the opposite longitudinal directions as viewed from the center of the ridged strap.

4. The combination of claim 1, wherein the tall and short ridges are inclined to the direction perpendicular to the longitudinal direction of the ridged strap.

5. The combination of claim 4, wherein each tall ridge is nearer to the subsequent short ridge than to the precedent short ridge in the opposite longitudinal directions as viewed from the center of the ridged strap.

6. The combination of claim 4, wherein each ridge is inclined at an angle varying from 5 to 30 degrees with respect to the perpendicular direction.

7. The combination of claim 1, wherein two tall ridges are arranged between adjacent short ridges in a staggered relation. Thus providing two sets of alternately arranged short and tall ridges on the one surface of the elongated band.

8. The combination of claim 7, wherein the ridges are arranged in a direction perpendicular to the longitudinal direction of the ridged strap.

9. The combination of claim 7, wherein the ridges are inclined to the direction perpendicular to the longitudinal direction of the ridged strap.

10. The combination of claim 1, wherein additional ridges of less height than the short ridges are integrally connected to the other surface of the elongated band in the opposite relation to the short ridges.

11. The combination of claim 1, wherein each tall ridge is of an upwardly-diverging shape in section.

* * * * *